Oct. 5, 1943.    G. A. SCHETTLER    2,330,928
SAFETY DEVICE
Filed Dec. 5, 1940    4 Sheets-Sheet 1

Fig. 1

Inventor
Gustav A. Schettler
By his attorney

Fig. 2

Oct. 5, 1943.   G. A. SCHETTLER   2,330,928
SAFETY DEVICE
Filed Dec. 5, 1940   4 Sheets-Sheet 4

Fig. 4

Inventor
Gustav A. Schettler
By his attorney

Patented Oct. 5, 1943

2,330,928

UNITED STATES PATENT OFFICE 2,330,928

SAFETY DEVICE

Gustav A. Schettler, Leeds, England, assignor to The Turner Tanning Machinery Company, Portland, Maine, a corporation of Maine Application December 5, 1940, Serial No. 368,689
In Great Britain February 3, 1940

29 Claims. (Cl. 192—133)

This invention relates to the provision of safety devices in machines utilized in operations upon work pieces introduced into the machine by a machine attendant. While the invention is illustrated as embodied in a machine wherein work pieces are treated by a rotary tool and in which the possibility of injury to the attendant is due largely to a work presenting member movable between work receiving and work presenting positions during successive half revolutions of a shaft, it is to be understood that the invention and various important features thereof may have other applications and uses.

It is an object of the invention to provide a safety device having special advantages in those machines of the class mentioned above wherein certain moving parts are controlled by stop motion devices arranged to become operative at predetermined points in the cycle of operations of the machine. In some cases, a moving part, such as a work presenting member, is brought to rest at the end of a half revolution of its driving means and in other cases at the end of a complete revolution of such driving means, such moving part of the machine being returned to its initial position as a preliminary to a subsequent cycle of the machine. In machines of this type, it is common to provide a clutch and a brake together with an operating member or members therefor under the control of the stop motion device, the arrangement being such that a stop motion member is operative to hold the clutch engaged and the brake released during a given cycle of operations, the arrangement being further such that, upon the stop member becoming operative to end the cycle, the clutch is automatically disengaged and the brake applied in bringing the moving parts of the machine to rest. It is a further object of this invention to provide a safety device which will operate in an emergency to cause disconnection of the clutch and application of the brake without disturbing operation of the stop motion device.

To these ends, and in accordance with an important feature of the invention, there is provided a safety device comprising a guard member having connections to initiate discontinuance of the power drive and applicant of a brake device, without disturbing operation of the stop motion device. For the accomplishment of this purpose, there is provided a releasable connection between the stop motion device and the member which controls the power means in the starting and stopping of the machine, in an arrangement in which the guard member through proper connections will trip the releasable connection and thereby effect disconnection of the power drive and application of the brake device, while the stop motion device remains in potentially operative condition. It is to be understood, however, that certain of the advantages of the invention may be obtained in machines which do not embody a brake device because of the small amount of momentum involved in the moving parts of the machine.

The invention will find its chief application in that class of machines which embody a work presenting member movable between work receiving position and work presenting position with respect to a work treating member of the machine. Since in this class of machines the work presenting member should come to rest in each of its two positions, it is common to provide in such machines a stop motion device to terminate the movement of such work presenting member and hold it in each of its positions. It is an important feature of the invention, therefore, to provide in this type of machine a guard member which will operate under pressure of the operator's hand to disconnect the power drive and apply the brake, thus eliminating all danger to the operator, while at the same time permitting the stop motion device to function in the normal manner, thereby securing proper operation of these parts in the succeeding cycles of the machine.

These and other important features of the invention and novel combinations of parts will now be described in detail in the specification and then pointed out more particularly in the appended claims.

In the illustrated embodiment of the invention, specially designed for boarding or graining operations on tanned skins, co-operating top and bottom boarding rolls of the machine are indicated at 1 and 2, respectively, and 3 represents the work table. The top boarding roll 1 is mounted in bearings (not shown) which are vertically slidable and adjustable within slots or guideways 4a formed in side frame members such as 4, whereas the bottom boarding roll 2 is mounted in fixed bearings on said frame members 4. The rolls are appropriately geared together.

Figure 4:
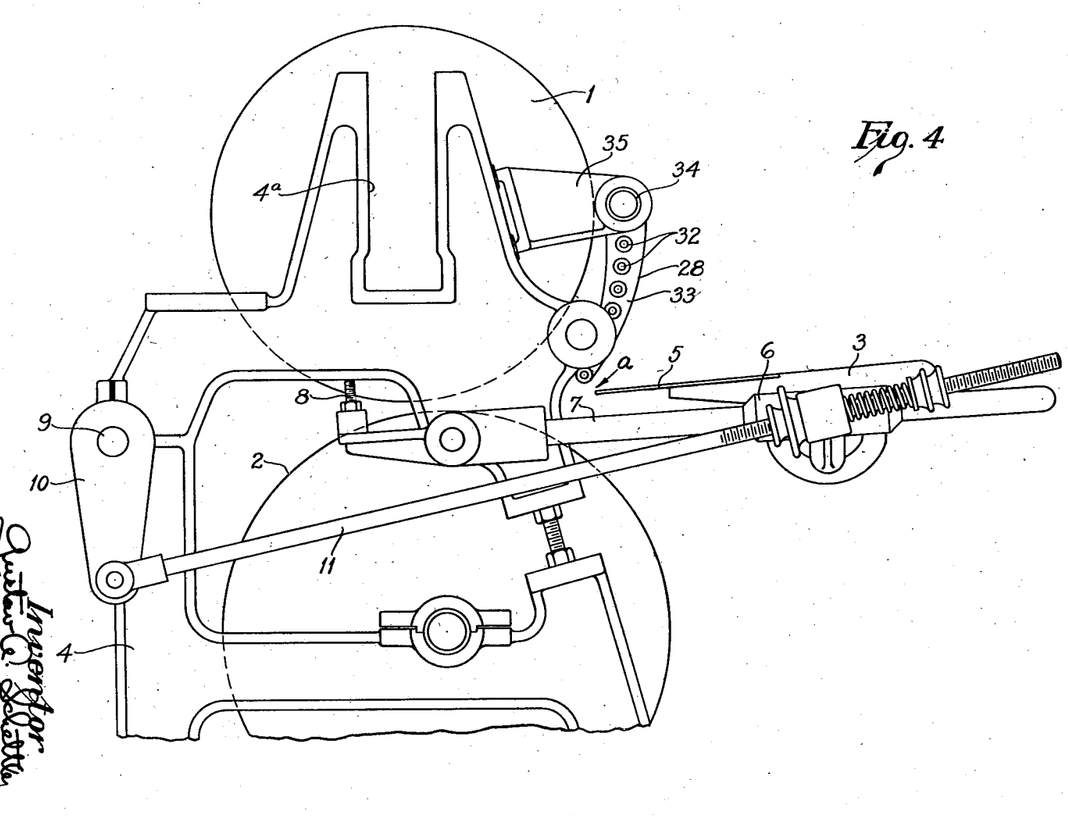
Fig. 4 is an end view of the machine showing the position of the safety guard in relation to the mechanism for moving the steel table into and out of its operative position.

The work table 3 is furnished with a steel plate 5 over which the skins to be boarded or softened are laid, with approximately one-half of a given skin hanging from the free edge of the table. The steel table 5 is adapted to be reciprocated, i. e. moved alternately forwards and backwards in the conventional manner. When moved forwards to its furthest extent, the frontal edge of the plate 5 coincides approximately with lines joining the longitudinal axes of the boarding rolls. As shown in Fig. 4, the table 3 is carried by a part 6 which is slidable on guide rods or bars 7. These rods or bars 7 may be adjustable heightwise to vary the position of the plate 5 with respect to the space between the rolls, e. g. by means of screw abutments such as that represented at 8 in Fig. 4.

Figure 1:
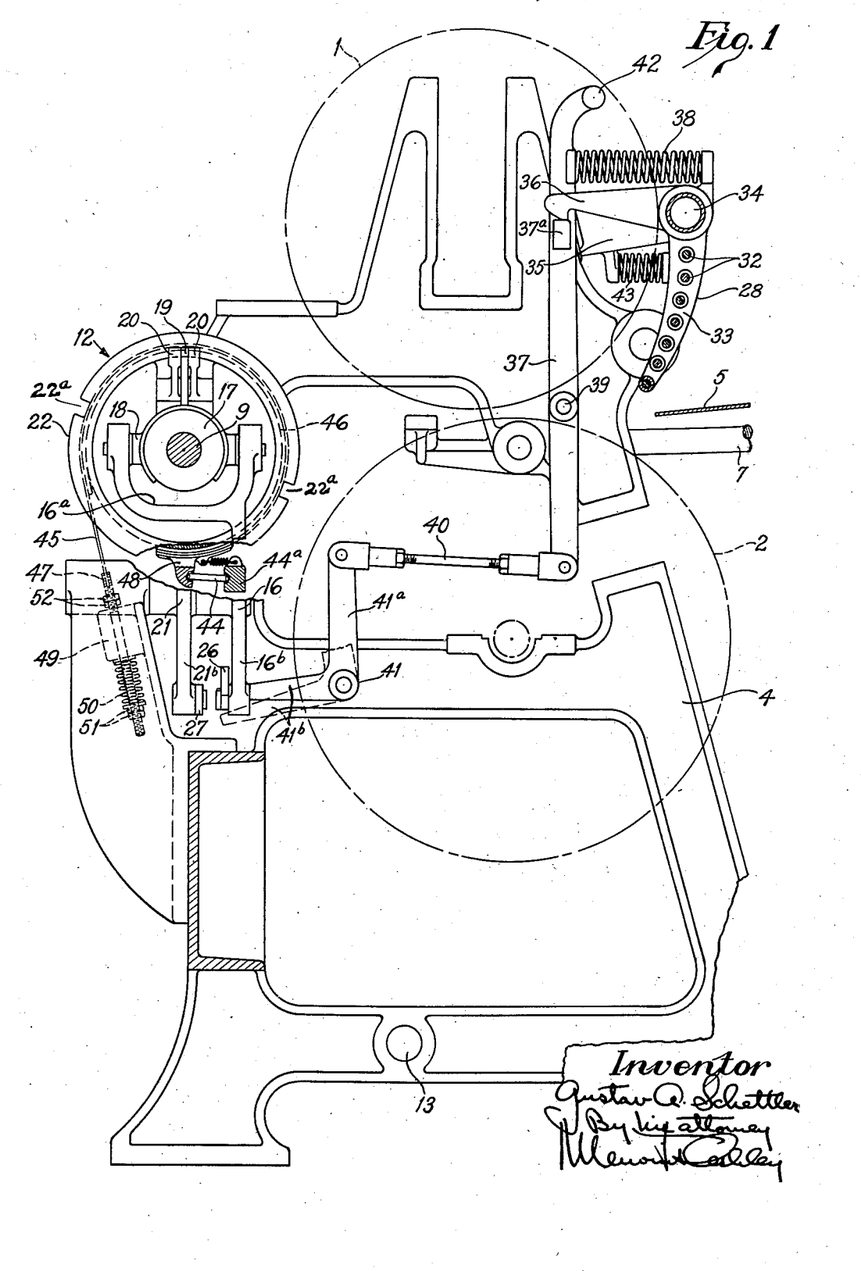
Fig. 1 is an end elevational view, partly in section, of a boarding machine illustrating the application thereto of the improved safety mechanism, the clutch being disengaged and the brake applied due to the tripping of the guard.
Figure 2:
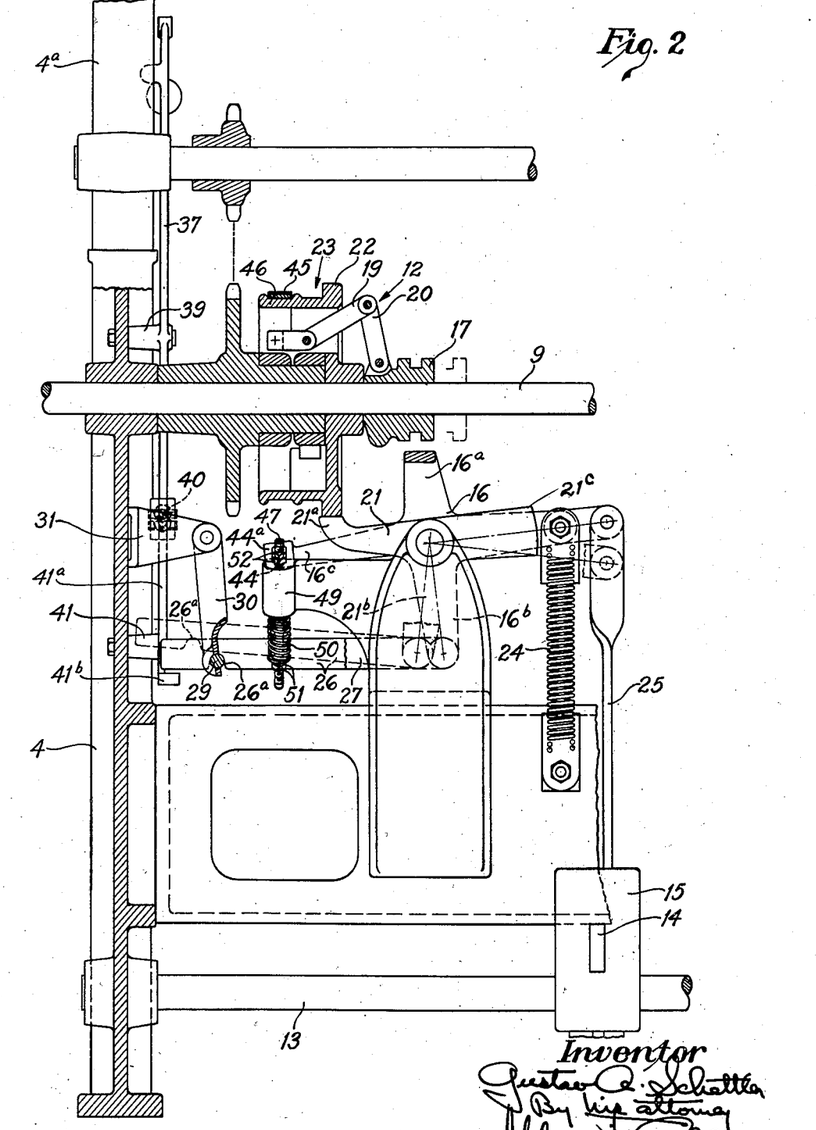
Fig. 2 is a vertical cross sectional view showing, more particularly, the clutch, the stop and clutch operating levers and associated parts, the clutch being engaged and the brake released.

Briefly considered, the mechanism for effecting reciprocation of the table 3 conveniently consists of a crank motion comprising a driven crank shaft 9 (Figs. 1, 2 and 4), crank arms 10 on said shaft and rods 11 for connecting the arms 10 with the slidable parts 6 on the rods 7. The forward and backward movements of the table 3 are controlled by a friction or any other suitable type of clutch which is associated with the crank shaft 9 and designated generally by the reference numeral 12 (Figs. 1 and 2). This clutch is operable at the will of the operator by means of a treadle. Although it is considered unnecessary to show the treadle, the treadle shaft, is however, represented at 13 in Figs. 1 and 2, while the rear end of one of the customary levers serving to support the treadle is indicated at 14 in Fig. 2. As will be seen the lever 14 supports a counterweight 15. For the sake of simplicity in illustration and description, only the more important parts of the clutch mechanism are shown and described, the general arrangement of such mechanism being understood by those skilled in the art. Engagement and disengagement of the clutch is effected by a clutch-operating lever 16 (Fig. 2) the upper forked portion 16a of which is connected to a slidable shipper cone 17 by means of a yoke 18 (see Fig. 1). The shipper cone 17 is in turn connected to the clutch by means of a toggle comprising a rocking lever 19 and a link 20 suitably pivoted together.

For the purpose of controlling the clutch parts, a stop lever 21 is provided, this lever being formed at one end with a protuberant portion 21a disposed for contact at appropriate times with the peripheral edge of a circular disk 22 which latter is concentric with respect to and rotatable with the rotary clutch housing 23 fixed to the shaft 9. The lever 21 has a weighted arm 21c which tends constantly to hold the part 21a of the lever against the disk 22. This stop lever 21 is associated with the lever 16 in a manner hereinafter to be described. The disk 22 is peripherally notched at diametrically opposed points and during normal running, the protuberant end portion of the stop lever 21 will drop off the peripheral surface of said part into one of the two notches 22a (Fig. 1) whenever the shaft 9 completes half a revolution.

In the illustrated construction, the clutch-operating lever 16 is controlled by an extension spring 24 arranged as shown in Fig. 2, and said lever is connected with the treadle mechanism by means of a link 25. The various means described in this paragraph therefore constitute a half cycle stop motion, the construction and arrangement of which is such that whenever the clutch parts are in engagement to drive the shaft 9, during normal running, the portion 21a of the stop lever is in contact with the peripheral surface of the circular part 22, as shown in Fig. 2. Upon completion of the half cycle, however, the said portion 21a drops into a notch 22a under the action of the spring 24, thereby turning the lever 16 to effect disengagement of the clutch and stoppage of the machine. Reengagement of the clutch to start the machine again can then only be effected by suitable actuation of the treadle to turn the levers 16 and 21 in a counter-clockwise direction (Fig. 2) against the spring action.

Heretofore, in a boarding and softening machine of the character concerned, the levers 16 and 21 have been positively connected together; but for the purpose of the present invention they are made separate and releasably connected by a link device including two links 26 and 27. This device is adapted to be operated in an emergency by a movable safety guard 28 for the purpose of effecting disconnection of the clutch-operating lever 16 from the stop lever 21, so as to permit of disengagement of the clutch and consequent stoppage of the machine without disturbing said stop lever 21. The link 26 is pivotally connected to the lower end of a downwardly extending arm 16b on the lever 16, and is formed on its underside with a notch 26a for reception of a pin 29 carried by a small lever 30. This lever is in turn pivoted to a bracket 31 attached to one of the side frame members 4. Similarly the link 27 is pivotally connected at one end to a downwardly extending arm 21b of the stop lever 21 and also engaged at or near its other end with the pin 29. For the sake of simplicity in illustration, the pin 29 and the lever 30 have been omitted from Fig. 1. Assuming the machine to be running, then, in the event of the link 26 being raised and thereby disengaged from the pin 29 (as indicated in dotted lines in Fig. 2) the clutch-operating lever 16 will be enabled, by reason of its disconnection from the stop lever 21, to turn in a clockwise direction (as viewed in Fig. 2) under the action of the spring 24 with the result aforesaid (i. e. disconnection of the clutch and application of the brake), while the portion 21a of the stop lever remains on the peripheral face of the circular part 22 due to the effect of the weighted arm 21c. When on the other hand, both of the links 26 and 27 are in engagement with the pin 29, the levers 16 and 21 will be connected in such manner as to enable them to function together in the customary manner.

The safety guard 28 is of well-known construction, comprising a series of parallel rods 32 held in suitable spaced relation by arms 33. Said guard is arranged for pivotal movement about a shaft 34 which is supported by brackets such as 35. The normal position of the guard is indicated in Fig. 4. In this figure the steel plate 5 is supposed to be moving inwards, towards the rollers 1 and 2. The danger point is indicated at a. Now, in the event of the operator unfortunately placing his hands over the frontal edge of the plate 5, they will come into contact with the lower portion of the guard 28, thereby tripping the latter and forcing it inwards, i. e. in a direction towards the rolls 1 and 2. According to the invention, such movement of the guard in an emergency will result in disconnection of the lever 16 from the stop lever 21 through the medium of intermediate connections now to be described.

To the guard shaft 34 is rigidly secured a catch lever 36 which is normally maintained in engagement with an element 37a (on or carried by a trip lever 37) by means of a compression spring 38. Fig. 1 purports to show the guard operative after having been tripped. The trip lever 37 is pivoted at 39 and connected by means of a connecting link 40, with one arm 41a of a bell crank 41. The link 40 is conveniently made adjustable lengthwise for the purpose of varying the relative positions of the catch and trip levers 36 and 37 respectively. The bell crank is so disposed that the other arm 41b thereof extends beneath the link 26. Accordingly, upon the guard 28 being tripped, in an emergency, the catch lever 36 is disengaged from the trip lever 37 with the result that the latter turns on its pivot 39 under the influence of the compression spring 38. Consequently the bell crank 41 is rocked clockwise (Fig. 1) to raise the link 26 and disengage it from the pin 29. Instantly, the clutch is disconnected and the brake applied through operation of spring 24 on lever 16.

Figure 3:
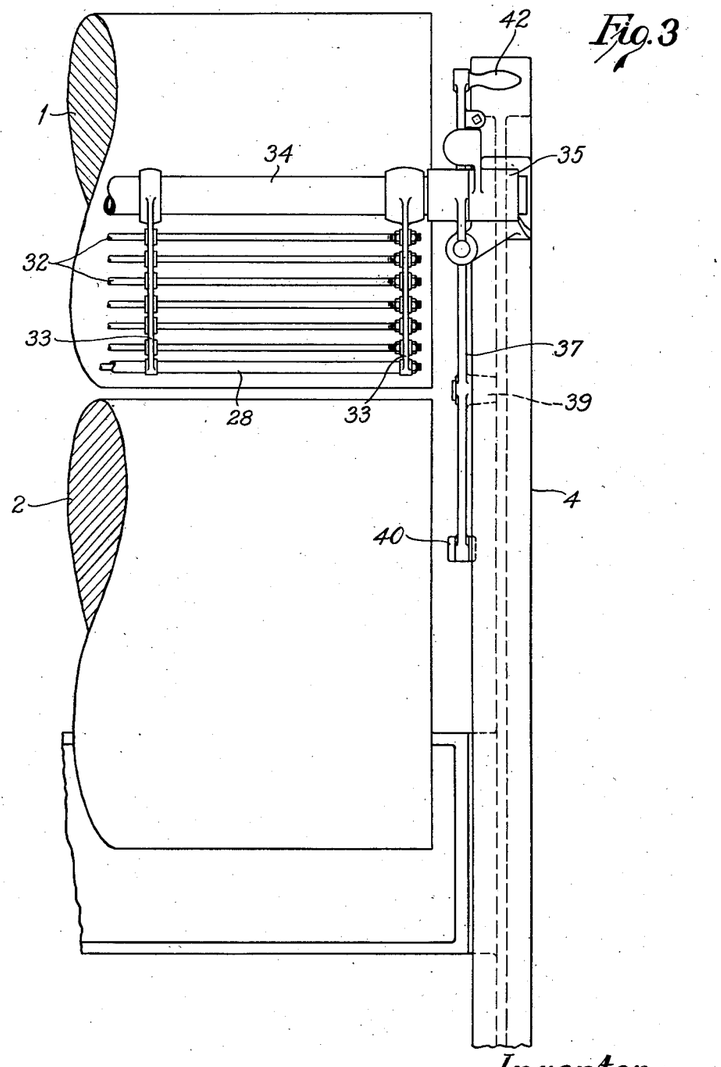
Fig. 3 is a front elevational view of a portion of the machine at one side thereof illustrating the relation of the safety guard to the boarding rolls, and means for resetting said guard after it has been tripped in an emergency.

For the purpose of resetting the mechanism after stoppage of the machine in an emergency, a handle 42 is provided on the top of the trip lever 37 (see more particularly Fig. 3). By pulling this handle forwards in a direction toward the guard shaft 34 the catch lever 36 is reengaged with the element 37a with the assistance of the spring 43. The next movement of the treadle then results in automatic reengagement of the link 26 with the pin 29 whereby connection between the levers 16 and 21 is reestablished. In Fig. 1 the normal inoperative position of the bell crank 41 is indicated in dotted lines.

As shown in Fig. 2, the clutch-operating lever 16 is shaped approximately like a cross. One arm 16a thereof is connected with the shipper cone 17, another with link 25 of the treadle mechanism, another 16b with the link 26, while the fourth 16c carries in its head 44a one end of a link, toggle or like device, such as 44 (Fig. 1) adapted (when the lever 16 turns to disengage the clutch) to effect application of a brake band 45 to a brake drum 46. This drum constitutes an integral part of the rotary clutch housing 23. The band 45 is passed around the drum 46 and connected at one end to an element 47 and at the opposite end to a shoe 48 which is adapted to be rendered operative and inoperative by means of the device 44. The element 47 is movable within a fixed part 49 of the machine frame and controlled by a spring 50 which is adjustable by means of the nuts 51. The normal position of the element 47 is determined by the nuts 52 which constitute an abutment and normally rest upon the top of the part 49. Thus, whenever the device 44 is operated to apply the brake, the nuts 52 are lifted away from the fixed part 49 and the spring 50 is slightly compressed, thereby enabling the brake band to be drawn about the drum 46 yieldingly. The clutch housing and integral brake drum together with the shaft 9 constitute the driver for the table 3, 5 of the machine.

As will be understood, therefore, in the event of the guard 28 being tripped in an emergency, not only is the clutch instantly disengaged but the brake is simultaneously applied. Each time the safety mechanism is brought into action, however, it is necessary to reset the same through the handle 42, in the manner previously described, before the machine can be used again.

Having fully described my invention, what I claim as new and desire to secure by Letters Patent of the United States is:

1. In a machine of the character described, a shaft, means for driving the shaft, a stop motion device having connections to the driving means to effect disconnection of the latter with respect to said shaft to stop the latter; said stop device being also operative to lock the shaft at a predetermined point in the rotation thereof, a manually controllable member for initiating an operation of the machine, a movable guard in position to be contacted by the hand of the operator, and means operated by the guard to discontinue the application of power to the shaft, while the stop motion device remains in potentially operative condition.

2. In a machine of the character described, a shaft, a brake for the shaft, means for driving the shaft, a stop motion device having connections to the driving means to effect disconnection of the latter with respect to said shaft to stop the latter, said stop device being also operative to lock the shaft at a predetermined point in the rotation thereof, a manually controllable member for initiating an operation of the machine, a movable guard in position to be contacted by the hand of the operator, and means operated by the guard to discontinue the application of power to the shaft and to apply the brake to the shaft, while the stop motion device remains in potentially operative condition.

3. In a machine of the character described, a shaft, means for driving the shaft of the machine, a stop motion device having connections to the driving means to effect disconnection of the latter with respect to said shaft to stop the latter, said stop device being also operative to lock the shaft at a predetermined point in the cycle, the combination of a safety device comprising a movable guard member, a brake device comprising a brake band and a band tightening member to prevent overrun of moving parts of the machine, connections between the guard member and said driving means to discontinue the application of power to the machine, and connections between the guard member and the brake band tightening member to initiate application of the latter, in case the guard member is moved by the hand of the operator, while the stop motion device remains in potentially operative condition.

4. In the machine of the character described, having a shaft, power means for driving the shaft, and a brake device for controlling said shaft, the combination of a manually controllable member for effecting operation of the brake; a stop motion device to stop and hold the shaft at a predetermined point in the rotation thereof, said stop motion device comprising a stop lever, means for releasably connecting the manually controllable member and said stop lever, and a guard member operative to trip the releasable connecting means and to initiate disconnection of said power means and application of the brake while leaving the stop lever in potentially operative condition.

5. A machine constructed according to claim 4, in which a bell crank lever is arranged to be operated by the guard member to trip the releasable connecting means between the stop lever and the manually controllable member for the brake.

6. A machine constructed according to claim 4, in which a link is provided as the releasable connecting means between the manually controllable member for the brake and the stop motion lever, so that tripping of the link by the movable guard member results in disconnection of power means and application of the brake while leaving the stop lever in potentially operative condition.

7. In a power driven machine provided with a clutch, a stop motion member and a manually controllable member for throwing in the clutch thereby initiating an operation of the machine, the combination of a movable guard in position to be contacted by the hand of the operator, a clutch operating member, a releasable connecting member between said clutch member and said stop motion member, and operative connections between the guard and said connecting member to release the latter thereby to initiate movement of the clutch to non-clutching position, while the stop motion member remaining in potentially operative condition when the clutch is thus disengaged.

8. In a power driven machine provided with a clutch, a stop motion device and a manually controllable member for alternatively engaging and disconnecting the clutch, the combination of a guard adapted to be moved by the hand of the operator, said stop motion device comprising a member operatively connected to said manually controllable member normally to move with the latter, and operative connections between the guard and said manually controllable clutch member to initiate disconnection of the clutch when the guard is moved by the hand of the operator, said stop motion device remaining in potentially operative condition whereby the parts driven by the clutch will be stopped at a predetermined place in the cycle upon disconnection of the clutch.

9. In a power driven machine provided with a clutch, a stop motion device and a manually controllable member for alternatively causing engagement and disconnection of the clutch, the combination of a guard member adapted to be moved by the hand of the operator, said stop motion device comprising a member releasably connected to the manually operable clutch controlling member, and connections controlled by the guard to trip the releasable member thereby to initiate disconnection of the clutch when the guard is moved by the hand of the operator, said stop motion device operating normally to stop the driven parts of the machine at a predetermined place on the cycle.

10. In a power driven machine provided with a clutch, a stop motion device and a manually controllable member for alternatively causing engagement and disconnection of the clutch, the combination of a guard member adapted to be moved by the hand of the operator, said stop motion device comprising a lever associated with said manually controllable lever, a releasable link operatively connecting the clutch operating member and stop motion lever, and an operative connection between said guard member and said link to move the link to inoperative position thereby disconnecting the clutch operating member and the stop motion lever from each other, whereby the guard member may initiate disconnection of the clutch while leaving the stop motion device in potentially operative condition.

11. In a power driven machine provided with a clutch, a stop motion device and a manually controllable member to operate the clutch for initiating an operation of the machine, the combination of a guard member adapted to be moved by the hand of the operator, said stop motion device comprising a lever associated with the clutch operating member, a releasable link operatively connecting the clutch operating member and the stop motion lever, a trip member for moving said link to inoperative position, and a connection between said guard member and the trip member whereby the latter is arranged to be operated by said guard member to effect disconnection of the link which operatively connects the clutch operating member and said stop motion lever so that the clutch may be disconnected while leaving the stop motion device in potentially operative condition.

12. In a power driven machine provided with a clutch, a stop motion device, and a manually controllable member for initiating an operation of the machine, the combination of a guard member adapted to be moved by the hand of the operator, said stop motion device comprising a lever associated with said manually controllable member, a releasable link operatively connecting the manually controllable member and the stop motion lever, a spring-pressed trip member operative to move the link to effect disconnection between said manually controllable member and stop lever, and connecting means between the guard member and said trip member whereby the latter is released to become operative when the guard member is moved by the hand of the operator.

13. In a machine of the character described, comprising power driven means including a clutch and a brake, the combination of a stop motion device effective to stop and hold the power driven means at a predetermined place in its cycle, a clutch operating member, a releasable connection between the said clutch member and the stop motion device, and a safety device comprising a movable guard having connections to effect release of the clutch and application of the brake and also to break said connection between the clutch member and the stop motion device, while leaving the stop motion device in potentially operative condition.

14. In a machine of the character described, power means comprising a clutch and a brake for operating the machine, a stop motion device, a control member for operating the clutch and brake, a pair of links releasably connecting the clutch operating member and said stop motion device, and a guard member having connections to trip one of said links whereby the clutch may be rendered inoperative and the brake applied while leaving the stop motion device in potentially operative condition.

15. In a machine of the character described, comprising a shaft, a clutch, and a brake, the combination of a stop motion device to determine the extent of rotary motion of the shaft, a manually controllable lever for operating the clutch and brake, a link releasably connecting the clutch operating member and said stop motion device, and a guard member having connections to trip said link whereby the clutch may be rendered inoperative and the brake applied without affecting the operative connection of the stop motion device with respect to the shaft to be stopped.

16. In a power driven machine provided with a shaft, a brake, a clutch, a stop motion device and a manually controllable member for initiating an operation of the machine, the combination of a guard adapted to be moved by the hand of the operator, a lever member manually operable to release the brake and to engage the clutch to initiate operation of the machine, said stop motion device comprising a lever associated with the clutch operating lever, a releasable link operatively connecting the clutch operating lever and the stop motion lever, and a connection between said guard and the releasable link to effect disconnection of the link thereby to initiate release of the clutch and application of the brake without interrupting the action of said stop motion device.

17. In a power driven machine provided with a shaft, a brake, a clutch, a stop motion device and a manually controllable member for initiating an operation of the machine by releasing the brake and engaging the clutch, the combination of a guard adapted to be moved by the hand of the operator, a lever member manually operable to move the clutch to initiate operation of the machine, said stop motion device comprising a lever associated with the clutch operating lever, a pair of releasable links operatively connecting the clutch operating lever and the stop motion lever, a trip member operative to move one of the links to effect disconnection between the clutch and stop levers, and connecting means between the guard and said trip member whereby the latter is operated when the guard is moved by the hand of the operator.

18. In a power driven machine provided with a clutch and a brake, a clutch operating member, a stop motion member, and a manually controllable member for releasing the brake and engaging the clutch to start the machine in operation and, alternatively, for disconnecting the clutch and applying the brake, the combination of a movable guard in position to be contacted by the hand of the operator, a releasable connection between the clutch operating member and the stop motion member, and connections between the guard and said manually controllable member to initiate disconnection of the clutch and application of the brake, said guard at the same time operating to release said releasable member whereby the stop motion device remains operative when the clutch is thus disengaged.

19. In a power driven machine provided with a clutch and a brake, a stop motion device and a manually controllable member for releasing the brake and engaging the clutch to start the machine in operation and, alternatively, for disconnecting the clutch and applying the brake, the combination of a guard adapted to be moved by the hand of the operator, said stop motion device comprising a member operatively connected to said manually controllable member normally to move with the latter, and connections between the guard and said stop motion member to trip the latter to initiate disconnection of the clutch and application of the brake when the guard is operated by the hand of the operator, said stop motion device remaining operative whereby the member driven by the clutch will be stopped at a predetermined place in the cycle.

20. In a power driven machine provided with a clutch and a brake, a stop motion device, and a manually controllable member for releasing the brake and engaging the clutch to start operation of the machine, the combination of a guard member adapted to be moved by the hand of the operator, said stop motion device comprising a notched disk and a locking member cooperating therewith, a releasable connection between said locking member and said manually controllable member, a spring holding said locking member pressed against the periphery of the disk and operative to cause the said member to drop into a notch in the disk, and connections between the guard member and said releasable connection to trip the latter thereby to initiate disconnection of the clutch and application of the brake when the guard is moved by hand of the operator, without interfering with the action of the stop motion device.

21. In a machine of the character described, a work treating member, a work presenting member, power means for operating said work presenting member between work receiving and work presenting positions, said means comprising a clutch, a member for operating the clutch, a stop motion device effective to hold the work presenting member in either of its two positions, said device including a member having a smooth surface with regularly spaced notches therein and a stop member to engage in such notches one at a time to determine exactly the said positions of the work positioning member, a spring having connections to said stop member to hold it yieldingly against said smooth surface, a releasable connection between the stop member and the said clutch operating member, whereby said spring tends constantly to move said clutch member in a direction to release the clutch, and a safety device comprising a movable guard having connections to effect release of said releasable connection so that said spring becomes operative to effect disconnection of the clutch upon movement of said guard.

22. In a machine of the character described, a work treating member, a work presenting member movable between work receiving and work presenting positions, a stop motion device to determine each position of said work presenting member, power means comprising a clutch for operating said work presenting member, a manually controllable member for operation of the clutch, a releasable connection between said manually controllable member and the stop motion device, and a guard member adapted to be operated by the hand of the operator and having a connection to trip said releasable connection whereby the clutch may be disconnected without affecting the action of the stop motion device.

23. In a machine for operating on sheet material, a work treating member, a work presenting member, power means for operating said work presenting member between work receiving and work presenting positions, said means comprising a clutch and a brake, a member movable in one direction to release the clutch and apply the brake, a stop motion device effective to hold the work presenting member in either of its two positions, said device including a member having a smooth surface with regularly spaced notches therein and a stop member to engage in such notches one at a time to determine exactly the said positions of the work positioning member, a spring having connections to said stop member to hold it yieldingly against said smooth surface, a releasable connection between the stop member and the said movable member for the clutch and brake, whereby said spring tends constantly to move said movable member in a direction to release the clutch and apply the brake, and a safety device comprising a movable guard having connections to initiate release of said releasable connection so that said spring becomes operative to effect disconnection of the clutch and application of the brake upon movement of said guard.

24. In a machine for operating on sheet material, a work treating member, a work presenting member movable between work receiving and work presenting positions, a stop motion device to determine each position of said work presenting member, power means comprising a clutch and a brake for operating said work presenting member, a manually controllable member for operating the clutch and brake, a releasable connection between said manually controllable member and the stop motion device, and a guard member adapted to be operated by the hand of the operator and having a connection to trip said releasable connection whereby the clutch may be released and the brake applied without affecting the potentially operative condition of the stop motion device.

25. In a machine for operating on sheet material, having means for treating a work piece and provided with a work presenting member, power means comprising a clutch and a brake for moving said work presenting member between work receiving and work presenting positions, the combination of a stop motion device comprising a locking member for automatically terminating movement of the work presenting member in each of its directions of movement, a combined clutch and brake controlling member, means for releasably connecting the combined clutch and brake member with said locking member, and a guard member having connections to trip said connecting means whereby the clutch may be released and the brake applied without affecting the potentially operative condition of the stop motion device by said locking member.

26. In a machine for operating on sheet material, a work treating member, a work presenting member, power means comprising a shaft, a clutch and a brake for operating the work presenting member between work receiving and work presenting positions, clutch and brake controlling means comprising a member operative to effect connection and disconnection of the clutch and concomitantly therewith release and application of the brake, a stop motion device comprising a member associated with the combined clutch and brake member, operative connections between the clutch and brake member and the stop motion member, and a guard member having connections to effect disconnection of the clutch and brake member from the stop motion member whereby said clutch and brake member may effect disconnection of the clutch and application of the brake without affecting the potentially operative condition of the stop motion device.

27. In a machine for operating on sheet material, a shaft, a brake for the shaft, means for driving the shaft, a stop motion device to stop and lock the shaft at a predetermined point in the rotation thereof, a releasable connection between said stop motion device and said driving means, a guard adapted to be moved by the hand of the operator to release said releasable connection, a manually operable member for controlling the shaft driving means to initiate and terminate operations of the machine, a member for treating a work piece, a work presenting means movable by said shaft between work receiving and work presenting positions, and connections between the guard and said manually operable member to terminate the application of power to the shaft by said driving means and to apply the brake to said shaft when the guard is operated by the hand of the operator, said stop motion device remaining operative, by reason of said releasable connection, whereby the shaft will be stopped at a predetermined point in the cycle.

28. In a machine for operating on sheet material, having a driven shaft and a clutch and a brake, the combination of a stop motion device for the shaft, a manually controllable member for effecting disconnection of the clutch and application of the brake, said stop motion device comprising a stop lever, a releasable connection between the stop lever and said manually controllable member, a spring tending constantly to move the manually controllable member and the stop lever to operative position thereby to render the stop motion device operative, a guard member operable by the hand of the operator to serve as a safety device, and a spring pressed trip lever arranged to be released by the guard member and operative in turn to effect tripping of said releasable connection whereby the clutch is disengaged and the brake applied without affecting the potentially operative condition of the stop lever.

29. In a leather boarding machine having a pair of rolls for treating a piece of leather and a work presenting table movable between work receiving and work presenting positions with respect to said boarding rolls, the combination of driving means for the work table, a stop motion device to control the driving means to terminate the motion of the work table and bring it to rest alternately in work receiving and work presenting positions, a brake and a clutch device associated with said driving means, a manually controllable member for operating the clutch and the brake device, a releasable connection between said manually controllable member and the stop motion device, and a guard member having connections to said releasable connection to trip the latter to initiate disconnection of the clutch device and application of the brake device without affecting the potentially operative condition of the stop motion device.

GUSTAV A. SCHETTLER.

CERTIFICATE OF CORRECTION.

Patent No. 2,330,928. October 5, 1943.

GUSTAV A. SCHETTLER.

It is hereby certified that error appears in the printed specification of the above numbered patent requiring correction as follows: Page 1, first column, line 48, for "applicant" read --application--; page 4, first column, line 29, claim 7, strike out the word "while"; and that the said Letters Patent should be read with this correction therein that the same may conform to the record of the case in the Patent Office.

Signed and sealed this 18th day of January, A. D. 1944.

(Seal)

Henry Van Arsdale,
Acting Commissioner of Patents.